United States Patent [19]

Sinclair et al.

[11] Patent Number: 5,050,303

[45] Date of Patent: Sep. 24, 1991

[54] CHAIN SAW BAR FLUID PASSAGE SYSTEM

[75] Inventors: James B. Sinclair, Waterloo; Paul W. Pink, Kitchener, both of Canada; Michael D. Harfst, Milwaukie; Robin A. Plumbley, Portland, both of Oreg.

[73] Assignee: Blount, Inc., Montgomery, Ala.

[21] Appl. No.: 628,421

[22] Filed: Dec. 14, 1990

[51] Int. Cl.[5] .............................................. B23D 59/04

[52] U.S. Cl. .................................... 30/123.4; 30/383; 47/1.5

[58] Field of Search .................... 30/123.3, 123.4, 383, 30/387, 384, 385; 47/1.5, 8; 125/21; 144/34 R

[56] References Cited

U.S. PATENT DOCUMENTS 2,913,020 11/1959 Nielsen .
3,044,506 7/1962 Oehrli .
3,185,191 5/1965 Olsen .
3,279,508 10/1966 Ehlen et al. .
3,578,779 5/1971 Ishizaki .
3,621,896 11/1971 Hamilton .
4,027,986 6/1977 Patrick .................................. 47/1.5
4,819,332 4/1989 Sugihara et al. ................... 30/123.4
4,981,129 1/1991 Osterman et al. ............ 30/123.4 X

FOREIGN PATENT DOCUMENTS 654369 12/1962 Canada .
908296 4/1954 Fed. Rep. of Germany .
2321316 11/1974 Fed. Rep. of Germany .
880186 9/1989 Sweden .

*Primary Examiner*—Douglas D. Watts
*Attorney, Agent, or Firm*—Klarquist, Sparkman, Campbell, Leigh & Whinston

[57] ABSTRACT

An improved saw bar and a chain sawing assembly includes a frame which houses a drive engine or motor and receives the saw bar, an endless cutting chain, and a sprocket mechanically coupling the drive engine to the cutting chain. The saw bar includes a bar member having a slot formed therein through at least a portion of the thickness of the bar member, with the slot extending from an attachment end to a nose end of the bar member. The saw bar also has a channel assembly, such as a tubular channel assembly, positioned in cooperation with the slot to deliver fluid from the attachment end to a channel outlet. In one embodiment, the saw bar has an idler sprocket pivotally mounted within a sprocket mounting slot formed at the bar member nose end. The channel outlet opens into the sprocket mounting slot to deliver lubrication fluid to the sprocket teeth. In an alternate embodiment, the channel outlet comprises a plurality of apertures along the length of an exposed wall of the channel member. The plurality of apertures deliver a fluid to a surface which is formed during cutting.

A method is also provided of constructing an improved saw bar as described above.

17 Claims, 5 Drawing Sheets

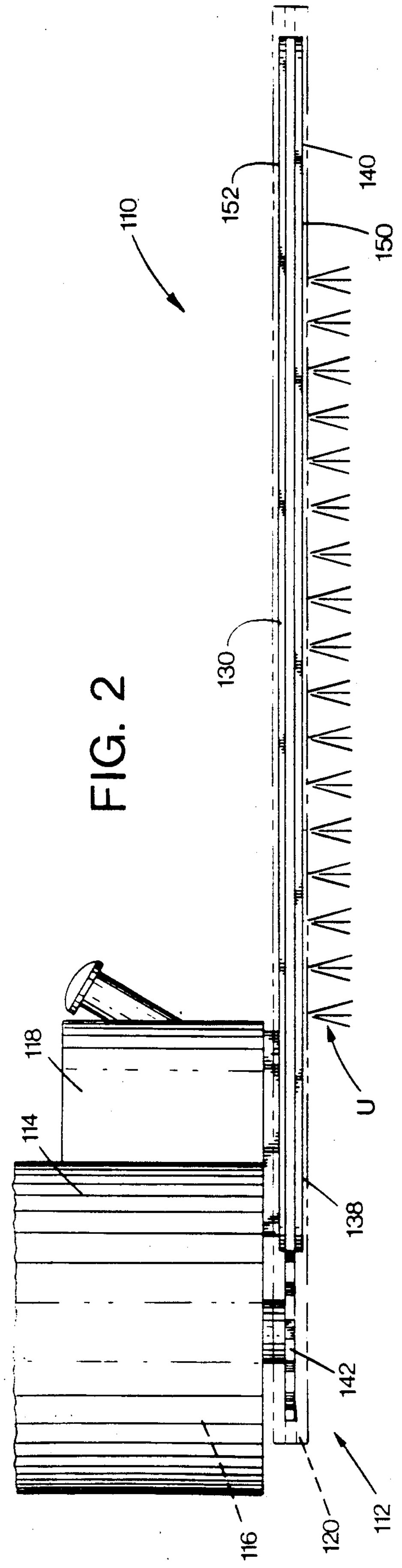
FIG. 2
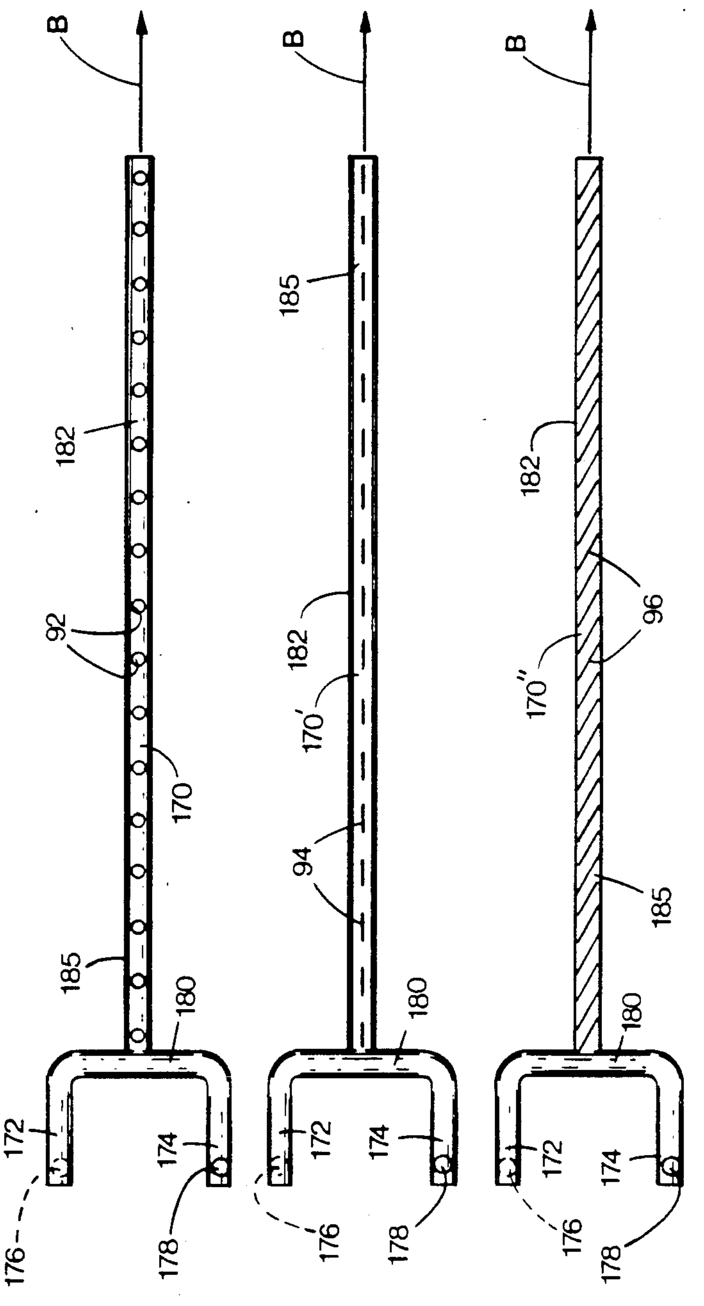
FIG. 9A
FIG. 9B
FIG. 9C

CHAIN SAW BAR FLUID PASSAGE SYSTEM

BACKGROUND OF THE INVENTION

The present invention relates generally to a chain sawing assembly, a saw bar for a chain sawing device and a method of manufacturing such a saw bar, and more particularly to an improved chain saw bar fluid passage system. Such a chain saw bar having an improved fluid passage system may be used to convey lubrication fluid, such as oil, to a chain saw bar sprocket, or used to spray a chemical, such as urea, on a tree being cut by such a chain sawing assembly.

Other chain saw bars having fluid lubrication passages therein have been used to convey lubrication fluid from a reservoir within the chain saw frame housing to remote locations on the chain saw bar. For example, U.S. Pat. Nos. 3,279,508, 3,621,896, 3,044,506, and German Patent No. 2,321,316 each disclose a laminated bar design constructed with two outer side plates surrounding an inner core plate. The inner core plate typically has at least one void therein which receives oil from holes extending through one or both of the outer side plates. The oil is delivered through the center core plate void to various outlet points, such as a saw bar guide groove which receives the guide links of an endless cutting chain, or a sprocket rotatably mounted at a nose end of the bar.

U.S. Pat. No. 4,819,332 to Sugihara et al. discloses a laminated bar system providing lubrication to a nose sprocket bearing assembly. The lubrication fluid is delivered through a void within the core plate from the frame housing reservoir to an auxiliary reservoir formed by an enlarged void within the core plate. This design requires external tubing to bridge the gap between the main portion of the saw bar and the sprocket to deliver the oil from the auxiliary reservoir to the sprocket bearing assembly. This external tubing enters the auxiliary reservoir through a hole within one of the outer side plates and delivers the oil to the sprocket bearing surface through a second hole in the side plate. A recess is formed in the exterior surface of the side plate to receive this external tubing.

U.S. Pat. Nos. 3,578,779 to Ishizaki, 2,913,002 to Nielsen, and 3,185,191 to Olsen, each disclose a saw bar lubrication system having a solid bar with an oil passageway formed in the bottom of the chain guide groove. This oil passageway typically has outlet openings near the nose end of the bar.

German Patent No. 908,296 discloses a solid saw bar lubrication system delivering oil to the cutting chain guide groove using a saw bar having a passage-forming insert fitted therein. A channel is milled into one side of the guide bar along a longitudinal axis. The channel extends from a proximate end inlet at the chain saw housing end of the bar to a distal end at a point spaced apart from the nose end of the bar. A solid elongated insert piece is then fitted into this channel extending between the proximate and distal ends. The insert piece and channel are each constructed to form an oil passageway therebetween, with the passageway stopping short of the distal end of the channel and insert piece. Transverse holes are drilled from the guide groove through the solid saw bar and a portion of the insert piece to interconnect the central oil passageway with the bottom of the chain guide groove.

These known saw bars suffer a variety of disadvantages. Generally, laminated bars are expensive and difficult to manufacture, requiring precise fits, close tolerances and a multiplicity of parts. Also, the known saw bars do not include means for applying a fluid to the surface of an item, such as a tree, being cut by the saw assembly.

Furthermore, saw bars are typically used at remote locations, and reliability of the saw bar, as well as the overall chain sawing assembly, is of the utmost importance to the operator. For example, if the saw bar becomes bent during transportation or use, the known saw bars cannot be satisfactorily bent back into a usable flat shape by an operator having few repair tools in the field or forest.

Saw bars are particularly vulnerable to damage when used with a tree harvester, but may produce superior results compared to other tree harvester cutting systems. For example, some known tree harvesters have arms that grip and support the upper portion of the tree while shears on the harvester sever the tree near the base. The pinching motion of the shears during cutting often splinters the tree causing butt damage to the wood. Alternatively, disk saws are be used to cut the tree base. However, the disk saws are easily damaged and costly to replace when dulled. When a cutting chain becomes dull, only the relatively inexpensive chain need be replaced, which makes chain sawing systems preferable to disk saws. To enhance the reliability of a chain saw bar and increase the desirability of using a chain cutting system in tree harvesters, the saw bar field repair problem must be overcome.

Thus, a need exists for an improved cutting assembly system and for an improved saw bar for use therewith, as well as for an improved method of manufacturing such a saw bar, which are not susceptible to the above limitations and disadvantages.

SUMMARY OF THE INVENTION

It is an overall object of the present invention to provide an improved chain sawing assembly, such as a chain saw or a tree harvester, for cutting various items, such as trees.

A further object of the present invention is to provide an improved saw bar for use with a chain sawing assembly.

An additional object of the present invention is to provide an improved method of manufacturing a saw bar having an internal fluid distribution system.

A further object of the present invention is to provide an economical method of manufacturing a saw bar having an internal fluid distribution system.

Still another object of the present invention is to provide a more reliable saw bar, such as one which may be straightened and placed back in service after being damaged by bending.

Yet another object of the present invention is to provide a saw bar and a chain sawing assembly using the saw bar capable of spraying a fluid on a surface formed during cutting.

Yet another object of the present invention is to provide an improved method of manufacturing a saw bar capable of spraying fluid on a surface formed during cutting.

According to one aspect of the present invention, a saw bar is provided for a chain sawing device having a frame which houses a drive engine and bar receiving means for receiving the saw bar. The sawing device also has an endless cutting chain and means for driving the cutting chain with the drive engine. The saw bar includes a bar member having an attachment end for receipt by the bar receiving means and a nose end opposite the attachment end. The bar member has a peripheral edge including guide means for guiding the endless chain about the peripheral edge. The bar means also has two opposing side surfaces defining a bar thickness therebetween, with one of the side surfaces having a slot formed therein through at least a portion of the bar thickness. The slot may extend from the attachment end to the nose end. The saw bar also has channel means positioned in the slot and extending from the attachment end toward the nose end. The channel means is provided for forming a fluid delivery channel in the saw bar to deliver a fluid from the attachment end to a channel means outlet.

According to another aspect of the present invention, a chain sawing assembly includes a frame having reservoir means for storing a fluid, and a drive engine housed by the frame. The assembly has an endless cutting chain and means for driving the cutting chain with the drive engine. The assembly also includes a saw bar as described above.

According to a further aspect of the present invention, a method is provided for manufacturing a saw bar for a chain sawing device, including the following steps. In a blanking step, a section of metal sheet stock is blanked into a general shape of a saw bar having two opposing side surfaces defining a bar thickness therebetween, a saw bar periphery, and opposing attachment and nose ends. In a forming step, a chain guide groove is formed around a portion of the saw bar periphery. In a cutting step, a slot is cut from one of the two opposing side surfaces through at least a portion of the bar thickness, with the slot extending from the attachment end to the nose end. In a securing step, a channel forming assembly is secured in the slot.

In one illustrated embodiment, the slot extends through the thickness of the saw bar and the channel forming assembly comprises a tubular assembly positioned in the slot and flattened into conformance therewith. The channel assembly is secured in the slot by brazing, after which inlet and outlet holes are cut through the tubular channel assembly. For a saw bar adapted to receive a sprocket at the nose end of the bar, the fluid may be a lubrication fluid which is delivered to the sprocket teeth. In this manner, the cutting chain may be lubricated through contact with the sprocket teeth during operation, which may also lubricate the saw bar rails adjacent the guide groove.

In an alternative illustrated embodiment, the slot extends through only a portion of the thickness of the saw bar to form a trough. The channel means comprises a tubular assembly which is positioned in the trough, flattened and brazed in place in the trough. The channel means outlet comprises a plurality of apertures extending through an exposed exterior sidewall of the tubular channel assembly. In this manner, a fluid, such as urea, may be spread across a surface being formed during cutting, such as across the newly exposed tree stump surface to prevent the growth of fungus therein.

The features and objects above relate to the present invention individually as well as collectively. These and other objects, features and advantages of the present invention will become apparent to those skilled in the art from the following description and drawings.

BRIEF DESCRIPTION OF THE DRAWINGS

FIG. 2 is a partial side elevational view of one form of a chain sawing assembly of the present invention comprising a tree harvester;

FIGS. 9A, 9B and 9C illustrate alternative embodiments of a channel means outlet of the saw bar of FIG. 2.

DETAILED DESCRIPTION OF A PREFERRED EMBODIMENT

Figure 1:
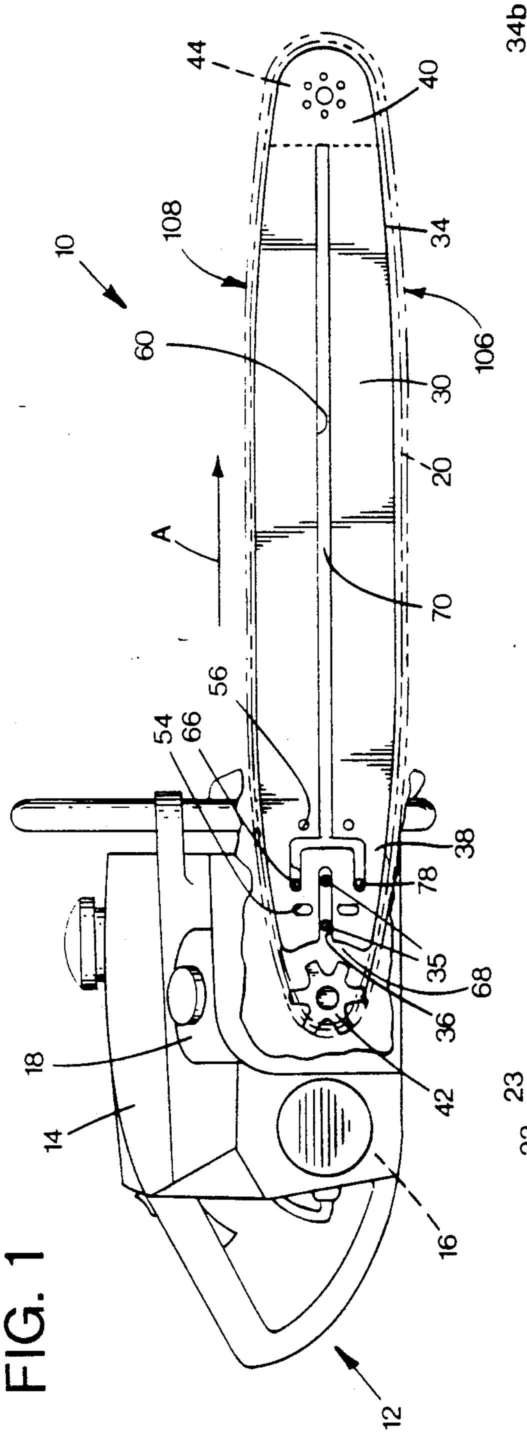
FIG. 1 is a side elevational view of one form of a chain sawing assembly of the present invention comprising a chain saw.

Referring first to FIG. 1, therein is illustrated a chain sawing device or assembly comprising a chain saw 12 having a saw bar 10 constructed in accordance with the invention. The chain saw 12 has a frame 14 which houses drive means, such as a drive engine 16, and reservoir means, such as reservoir 18, for storing a fluid therein.

Figure 4:
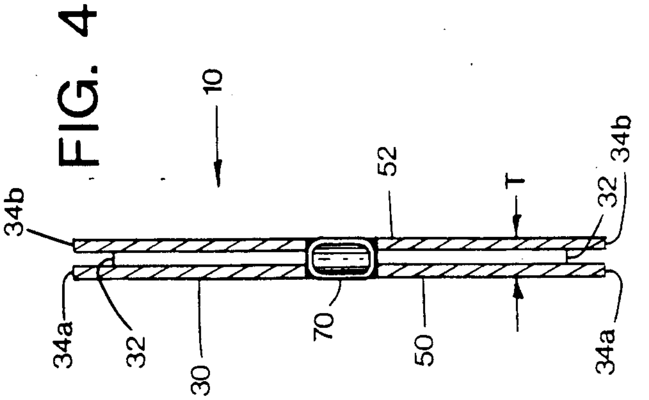
FIG. 4 is a sectional view taken along line 4—4 of FIG. 3.
Figure 3:
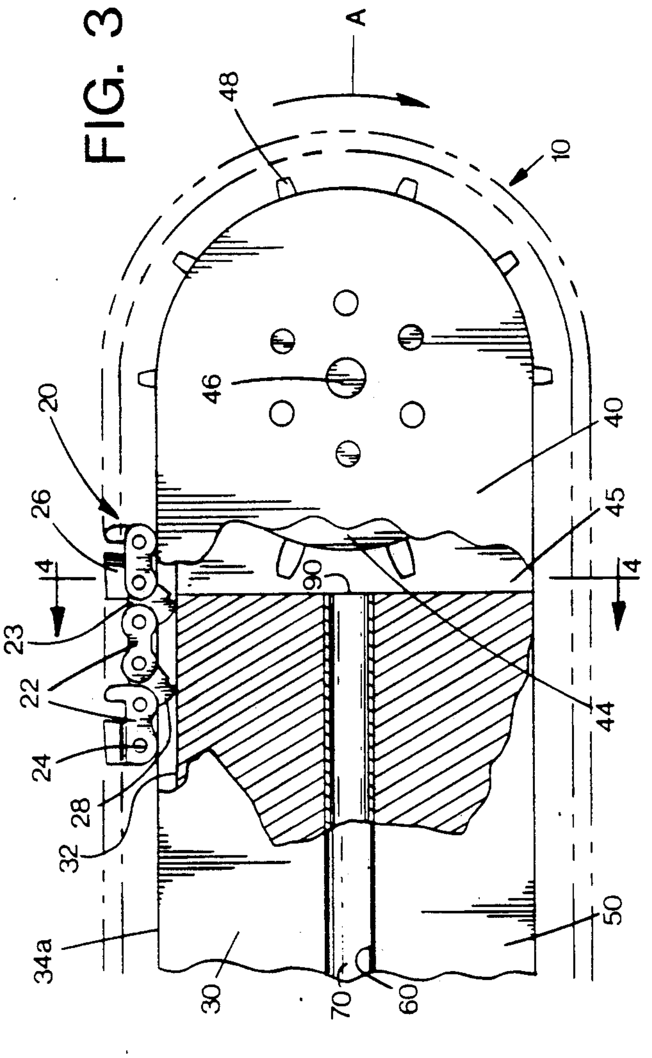
FIG. 3 is an enlarged partially cutaway side elevational view of a portion of one form of a saw bar of the present invention.

Referring now to FIG. 3, the chain saw 12 has a conventional endless cutting chain 20 comprising a plurality of side links 22 and intervening center links 23 secured to one another, such as by rivets 24. Some of the side links 22 carry cutting teeth 26, while some of the center links 23 comprise sprocket engaging tangs or guide members 28. Referring also to FIG. 4, the saw bar 10 includes a bar member 30 having guide means, such as guide groove 32. The guide groove 32 is defined by guide rails 34*a* and 34*b*, with the guide groove and rails extending around at least a portion of a peripheral edge 34 of bar member 30. The chain guide members 28 are received within guide groove 32, and the links 22 ride along guide rails 34*a* and 34*b*.

The chain saw frame 14 has bar receiving attachment means, such as bolts 35 which engage a mounting slot 36 formed at an attachment end 38 of bar member 30. The saw bar 10 is mounted to frame 14 with a nose end 40 of the bar member projecting outwardly from the frame. The drive means of chain saw assembly 12 also includes drive sprocket 42 which is mechanically coupled to and driven by drive engine 16. The drive sprocket 42 has a plurality of teeth which engage the chain links 22, 23. The drive engine 16 and sprocket 42 cooperate to propel chain 20 about the saw bar periphery 34 in a direction indicated by arrow A in FIG. 1.

The saw bar 10 also has an idler or nose sprocket 44. To receive nose sprocket 44, the bar member 30 has sprocket receiving means, such as a sprocket mounting slot 45 formed at nose end 40 and bearing means, such as a ball bearing assembly 46. The idler sprocket 44 includes a plurality of outwardly projecting teeth 48 which engage guide members 28 as the chain 20 is propelled about the saw bar nose end 40.

It is particularly advantageous to the operation of the chain saw assembly 12 to provide a lubrication fluid, such as oil, to the chain 20 at a point distant from frame 14. To accomplish this, the oil is preferably provided to the nose sprocket teeth 48 which distribute the oil to the chain 20 when engaged by the nose sprocket. The saw bar 10 addresses this concern.

Referring to FIGS. 4, 5A, 6 and 7A–7C, the bar member 30 has two opposing sidewalls or side surfaces 50 and 52 defining therebetween a bar thickness T. In the preferred embodiment, the bar member 30 comprises a solid unitary member between the two opposing side surfaces 50 and 52. The general shape of bar member 30 may be blanked from a section of a solid sheet or flat stock of a steel material. The blanking operation may be performed by any of a variety of known methods, such as punching or laser cutting the saw bar blank.

Additional mounting holes, such as holes 54 and 56, as well as mounting slot 36, may be formed in the bar member 30 during the blanking operation. Alternatively, mounting holes 54 and 56 may be laser cut or drilled, and the mounting slot 36 may be laser cut or milled, in bar member 30 after the blanking operation. After the blanking step, the guide groove 32 is formed around at least a portion of the saw bar periphery 34 by any of a variety of known operations, such as by grinding.

The bar member 30 is formed with a slot 60 that extends laterally through the bar and longitudinally from adjacent the attachment end 38 to adjacent the nose end 40 of the bar member 30. At the attachment end 38, the slot 60 branches or forks into at least two slot branches, such as branches 62 and 64. The slot 60, including branches 62 and 64, may be formed by any of a variety of known methods, such as by laser cutting.

The frame 14 of chain saw 12 may have at least one fluid outlet passage means, including frame outlet means, such as an outlet hole 66 (FIG. 1), for delivering a fluid from the reservoir 18 to the saw bar 10. The outlet passage means comprises internal tubing means and/or a passageway (not shown) coupling reservoir 18 to the outlet hole 66. The slot branches 62 and 64 are positioned in the bar member 30 symmetrically about a longitudinal axis of the bar. The saw bar 10 is captured between a mounting plate 68 on the frame 14 and a cover plate (not shown), so one of the slot branches 62 or 64 is adjacent the outlet hole 66.

Channel forming means are provided in cooperation with slot 60 to form a channel through which fluid may be delivered from end 38 to end 40. Preferably, such channel forming means comprises a channel assembly 70 mounted within the slot 60 and branches 62, 64. The channel assembly 70 is positioned in cooperation with slot 60 to form and define an interior passageway or fluid delivery channel 71 from adjacent the attachment end 38 to adjacent the nose end 40. The channel assembly 70 branches or forks into at least two channel branches 72 and 74, which are sized to be received by slot 60 and slot branches 62 and 64, respectively.

The channel assembly 70 includes means for receiving fluid from the fluid outlet passage means of the chain saw 12. For example, branches 72 and 74 have respective channel inlet holes 76 and 78 formed therein such that hole 76 opens toward bar sidewall 52 and hole 78 opens toward bar sidewall 50. Advantageously, this symmetrical arrangement may double the wear life of the saw bar 10. For example, when worn along a cutting edge 106 during use, the saw bar 10 may be turned over so edge 108 serves as the cutting edge. The channel inlet hole 76 is positioned to receive fluid from the frame outlet hole 66 when edge 106 serves as the cutting edge, and hole 78 is positioned to receive fluid from the frame outlet hole 66 when edge 108 serves as the cutting edge. With the saw bar 10 captured between the frame mounting plate 68 and a cover plate (not shown) so one of the holes 76 and 78 is aligned with frame outlet hole 66, the cover plate seals the other of holes 76 and 78.

A method of manufacturing a saw bar 10 of the present invention will be described wherein the bar member 30 is blanked, the chain guide groove 32 formed around a portion of the periphery 34 of the bar member, and the slot 60 is formed in the bar member, as described above.

Referring to the illustrated embodiment in FIGS. 5A, 6 and 7A–7C, thereafter the channel assembly 70 is assembled from two lengths of tube stock or tubing, such as an inlet tubing member 80 and an outlet tubing member 82. The inlet tubing member 80 is bent into a U-shape. The inlet tubing member 80 has a hole 84 formed therethrough and sized to receive the outlet tubing member 82. The channel assembly 70 is assembled by inserting the outlet tubing member 82 into hole 84 of the inlet tubing member 80. The inlet and outlet tubing members 80 and 82 may be secured together prior to positioning within slot 60, or they may be positioned within slot 60 without being firmly attached to one another. At this point, the tubular channel assembly 70 has sidewalls which protrude outwardly beyond side surfaces 50 and 52 in FIG. 7A.

Figures 6, 7A, 7B, 7C:
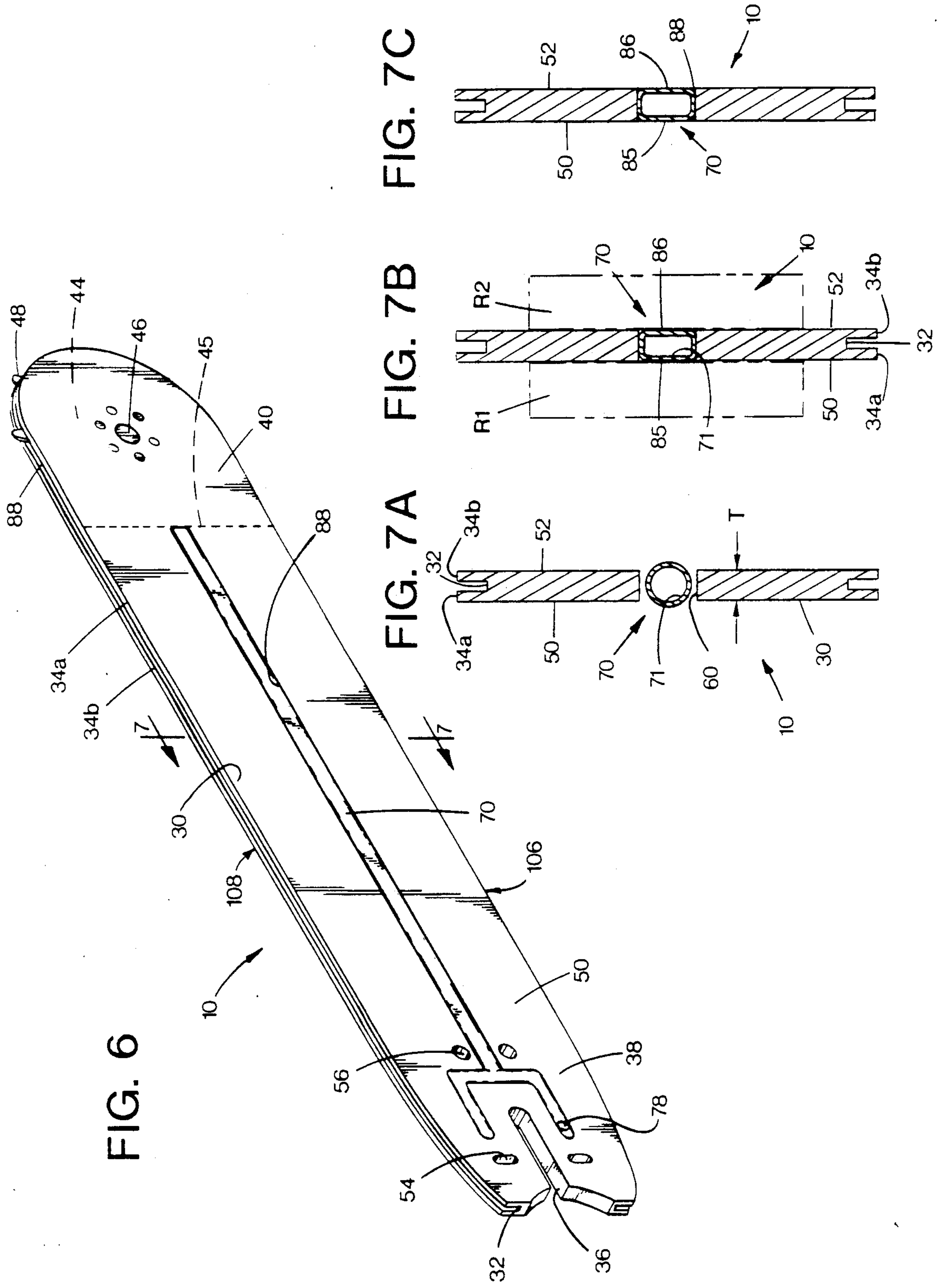
FIG. 6 is an assembled perspective view of the saw bar of FIG. 5A.
FIGS. 7A, 7B and 7C are sectional views of a saw bar, taken along line 7—7 of FIG. 6, which illustrate the sequential steps of one form of a method manufacturing the saw bar of FIG. 1.

With channel assembly 70 positioned in slot 60, the tubular channel assembly 70 is then flattened into the slot, such as by running the length of the bar member 30 through two opposing flattening rollers R1 and R2 (see FIG. 7B). During this flattening operation, rollers R1 and R2 deform the tubular channel assembly 70 into a rectangular shape. The flattened channel assembly of FIG. 7B has opposing first and second exposed exterior walls 85 and 86 which are substantially coplanar with the bar member side surfaces 50 and 52, respectively. The flattening operation may also be used to deform and secure together the inlet and outlet tubing members 80 and 82 at hole 84.

The channel forming assembly 70 is then secured in slot 60, such as by brazing. Brazing material 88 is selected in accordance with the materials of the bar member and channel assembly. The brazing material 88 may be placed in the corners between the slot 60 and the flattened tubular channel assembly 70. With the brazing material 88 in place, the channel assembly 70 may be brazed to the bar member 30 by transporting the saw bar 10 through a braze furnace with a conveyor or other type of article transporter. Alternatively, laser brazing may be used to secure the channel assembly 70 and bar member 30 together. Before brazing, extra brazing material may be placed adjacent the hole 84, to further secure the joint between the inlet and outlet tubing members 80 and 82.

After the channel assembly 70 is brazed in place, the idler sprocket mounting slot 45 is formed within the bar member nose end 40, for example by milling. The sprocket slot 45 is milled to intersect the channel outlet tubing member 82 to form a channel outlet 90 at the nose end of channel assembly 70 (see FIGS. 3 and 5A).

In operation, a lubrication fluid, such as oil, may be delivered from reservoir 18 through the passage means within frame 14 to the fluid outlet passage means outlet hole 66 and into the channel means inlet hole 76 or 78 aligned with hole 66. From there, the oil flows through the interior passageway 71 of the channel branch 72 or 74 having the inlet hole aligned with hole 66. The oil flows through the channel branch, along the length of the channel assembly 70, and is delivered to a point of exit at the channel outlet 90. The lubrication fluid travels from the channel outlet 90 to the nose sprocket teeth 48. The sprocket teeth 48 engage and supply the oil to the chain links 22 which lubricate the guide groove 32 and guide rails 34*a* and 34*b* when chain 20 is driven by the drive engine 16.

Referring to FIGS. 2, 5B, 8A–8C and 9A–9C, a tree harvester 112 having saw bar 110 constructed in accordance with the present invention will be discussed. For clarity in numbering the components, similar components on the tree harvester 112 and the chain saw 12 differ in item numbers by one hundred. The tree harvester 112 has a frame 114 which houses drive means, such as a hydraulic motor drive 116, and reservoir means, illustrated schematically as reservoir 118, for storing a fluid, such as urea U, therein.

The tree harvester 112 has an endless cutting chain 120 (indicated in dotted lines in FIG. 2) which may be constructed as set forth above for chain 20. The saw bar 110 includes a bar member 130 having guide means, such as guide groove 132. The guide groove 132 is flanked by guide rails 134*a* and 134*b*, with the guide groove and rails extending around at least a portion of a peripheral edge 134 of bar member 130. The guide members of chain 120 are received within guide groove 132, and side links of chain 120 ride along guide rails 134*a* and 134*b*.

The tree harvester frame 114 may have suitable bar receiving attachment means for mounting an attachment end 138 of saw bar 110 to frame 114 with a nose end 140 of the bar member projecting outwardly from the frame. To drive chain 120, the drive means of tree harvester 112 also has a drive sprocket 142 which is mechanically coupled to and driven by the hydraulic motor 116.

The saw bar 110 may also have an idler or nose sprocket 144 received within a sprocket mounting slot 145 and supported by a bearing assembly 146. The idler sprocket 144 has teeth 148 which engage the chain 120 as it is propelled about the saw bar nose end 140.

The bar member 130 has two opposing sidewalls or side surfaces 150 and 152 defining therebetween a bar thickness T′. In the preferred embodiment, the bar member 130 comprises a solid unitary member between the two opposing side surfaces 150 and 152. The bar member 130 may be formed as described above for bar member 30 with respect to the blanking operation, forming of mounting holes, such as holes 154 and 156, a mounting slot 136, and the guide groove 132.

Figure 5A:
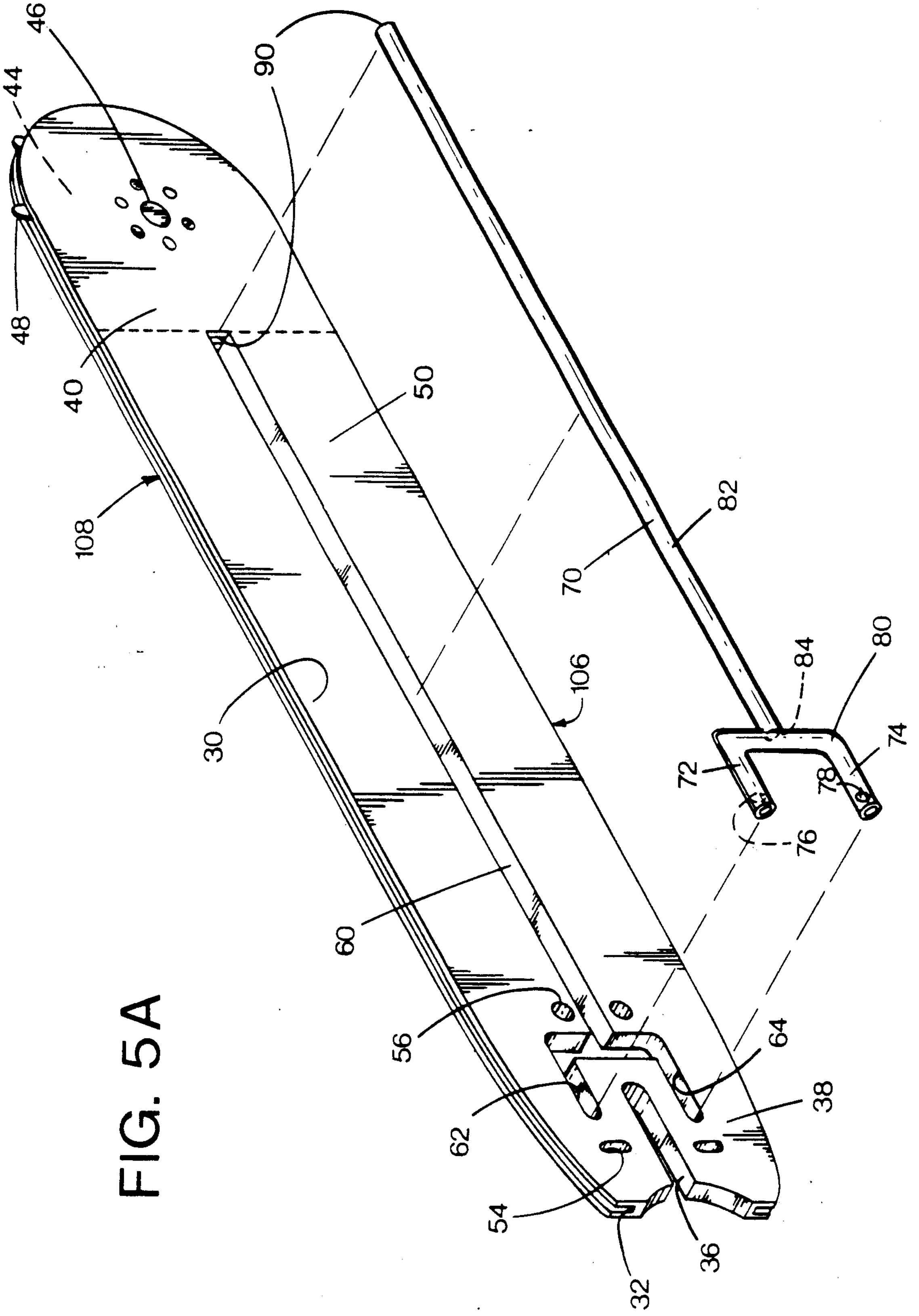
FIG. 5A is an exploded perspective assembly view of the saw bar shown in FIG. 1.
Figures 5B, 8A, 8B, 8C:
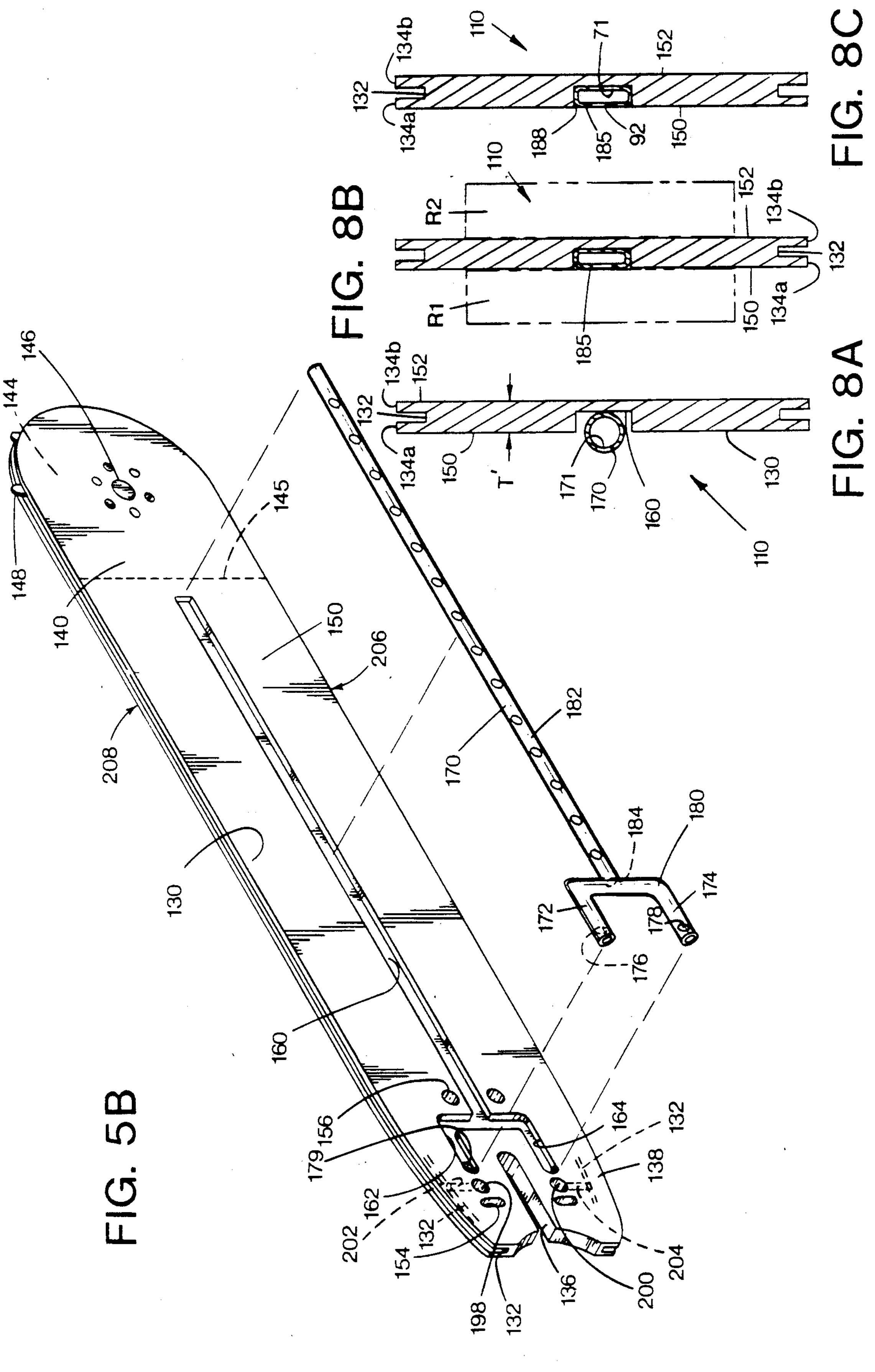
FIG. 5B is an exploded perspective assembly view of the saw bar shown in FIG. 2.
FIGS. 8A, 8B and 8C are views of the saw bar of FIG. 2, shown in a vertical orientation, which illustrate the sequential steps of one form of a method manufacturing the saw bar of FIG. 2.

FIG. 5B illustrates bar member 130 for saw bar 110 as having a partial slot or trough 160 formed in one of the side surfaces, such as surface 150, of the bar member 130. The slot 160 extends from side surface 150 through only a portion of the bar thickness T′. The slot 160 extends from adjacent the attachment end 138 to adjacent the nose end 140 of the bar member 130. The slot 160 may be cut partially through the thickness T′ of bar member 130 by milling. The slot 160 may include slot branches 162 and 164 which may be formed in bar member 130 at a depth equal to, or different than, that of slot 160.

The saw bar 110 also includes channel forming means which cooperate with slot 160 to form a channel through which fluid may be delivered from end 138 to end 140. Preferably, such channel forming means comprises a channel assembly 170 mounted within the slot 160 and branches 162, 164. The channel assembly 170 is positioned in cooperation with slot 160 to form and define an interior passageway or fluid delivery channel 171 within the saw bar. The illustrated channel assembly 170 extends from adjacent the attachment end 138 to adjacent the nose end 140, and branches or forks into at least two channel branches 172 and 174.

The channel assembly 170 includes means for receiving fluid from the frame fluid outlet passage means, such as channel inlet holes 176 and 178 formed in branches 172 and 174, respectively. The tree harvester frame 114 has fluid outlet passage means interconnecting reservoir 118 with channel inlet holes 176 and 178. The channel inlet hole 176 opens toward bar sidewall 152 and hole 178 opens toward bar sidewall 150. The partial slot branch 162 has an inlet hole 179 therethrough for the channel inlet hole 176 to receive fluid from the frame fluid outlet passage means when edge 206 serves as the cutting edge. When edge 208 serves as the cutting edge, the channel inlet hole 178 receives fluid from the frame fluid outlet passage means. When the saw bar 110 is mounted to frame 114 between the frame and a cover plate (not shown), one of the holes 176 and 178 is aligned with the frame fluid outlet passage means and the cover plate seals the other of holes 176 and 178.

A method of manufacturing the saw bar 110 of the present invention is similar to that described above for saw bar 10, except for the formation of slot 160 extending only partially through the bar member 130. Also, the inlet hole 179 must be formed through the slot branch 162, such as by punching or drilling. Additionally, slot 160 preferably terminates short of intersecting with the sprocket mounting slot 145.

Referring to the illustrated embodiment in FIG. 5B, the channel assembly 170 is assembled from two lengths of tube stock or tubing, such as an inlet tubing member 180 and an outlet tubing member 182. The channel assembly 170 may be assembled in the manner described above for channel assembly 70 and inserted into the milled slots 160 and branches 162, 164 in the bar member 130. At this point, the tubular channel assembly 170 has a sidewall which protrudes outwardly beyond the bar member side surface 150 in FIG. 8A.

The tubular channel assembly 170 is then flattened into slot 160, such as by running the length of the bar member 130 with channel assembly 170 positioned in slot 160 through two opposing flattening rollers R1 and R2 (see FIG. 8B). During this flattening operation, rollers R1 and R2 deform the tubular channel assembly 170 into a rectangular shape with one exposed, outwardly facing, exterior channel wall 185 which may be substantially coplanar with side surface 150. The channel forming assembly 170 may then secured in slot 160 as described above for channel assembly 70, such as by brazing. Brazing material 188 may be placed in the corners between the slot 160 and the flattened tubular channel assembly 170, and the channel assembly 70 may be brazed in place (see FIG. 8C).

FIGS. 9A, 9B and 9C illustrate three alternate embodiments of the channel means outlet for saw bar 110. Each channel outlet embodiment comprises a plurality of apertures extending through the exterior wall 185. The outlet apertures may run substantially the entire length of the outlet tubing member 182.

In FIG. 9A, the channel assembly 170 has a plurality of circular apertures, such as holes 92, which may be laser cut or drilled through the exterior wall 185. FIG. 9B illustrates an alternate channel assembly 170' having a plurality of short outlet slot apertures, such as outlet slots 94. Each outlet slot 94 runs parallel to a longitudinal axis B of the outlet tubing member 182. A single, double or more rows of outlet slots 94 may be included in the channel assembly 170, with the length of the slots varying as required for the particular application. FIG. 9C shows an alternate channel assembly 170" having a plurality of parallel diagonal outlet slot apertures, such as outlet slots 96. Each outlet slot 96 is positioned at a given angle to the longitudinal axis B, with the angle varying as required for the particular application. While the apertures 92, 94 and 96 are illustrated as being equal in size and placement for each embodiment, it is apparent that the sizes and placements of these apertures may be varied to provide a desired flow of the fluid to a surface being cut by the chain sawing assembly.

The apertures 92, 94 or 96 may be formed through the channel member exterior wall 185 before, between or after the steps of assembling the channel assembly 170, inserting the channel assembly in slot 160, and securing the channel assembly in place. For example, in FIGS. 9A–9C, the apertures 92, 94 and 96 have been formed in outlet tubing member 182 before inserting the channel assembly into slot 160. The apertures 92, 94 or 96 may be formed by any of a variety of known methods, such as by drilling or by laser cutting. The channel inlet holes 176 and 178 may be formed in the inlet tubing member 180 prior to assembly within slot 160, or after assembly and brazing of the channel assembly 170 in place.

In operation, the saw bar 110 receives a fluid, such as urea U, from reservoir 18 (see FIG. 2) through one of the channel inlet holes 176 or 178. The urea then travels along the interior passageway 171 of the channel assembly 170 to the channel outlet, which may be apertures 92, 94 or 96, to spray urea U on a surface being cut (see FIG. 2). The urea is believed to be useful in preventing fungus from growing in a tree stump left after the tree has been cut down. The fluid may be a paint or other material preservative applied to the surface formed during cutting with saw bar 110.

To lubricate chain 120, the bar member 130 has conventional lubrication passageways interconnecting with lubrication outlet ports (not shown) on the tree harvester frame 114. For example, the lubrication passageways may comprise holes 198 and 200 extending through the thickness T' of attachment end 138, with passageways 202 and 204 extending from holes 198, 200, respectively, to the bottom of guide groove 132. For saw bar 110, the slot branches 162 and 164, as well as channel branches 172 and 174, may be shorter than those for saw bar 10 of FIG. 1.

As described above, the saw bar 110 is symmetrical along a longitudinal axis of the bar. When worn along a cutting edge 206 during use, the symmetrical saw bar 110 may be advantageously be turned over so edge 208 becomes the cutting edge, thereby doubling the wear life of the saw bar.

Alternatively, it is apparent that saw bar 10 may have a partial slot as shown in FIG. 5B extending through only a portion of the bar thickness T, and saw bar 110 may have a through slot as shown in FIG. 5A. Other combinations may also be useful in a particular application, such as the partial slot 160 of saw bar 110 having slot branches as 62 and 64 extending completely through the bar thickness T'.

Having illustrated and described the principles of our invention with respect to two preferred embodiments, it should be apparent to those skilled in the art that our invention may be modified in arrangement and detail without departing from such principles. For example, the depth, width, placement, and pattern of slot 60 or 160 may vary as required by the particular application. The channel means may be formed by securing a channel forming plate (not shown) over slot 60 or 160 along the side surface 50 or 150, or within a recess (not shown) formed in this side surface. A second channel forming plate (not shown) may also be secured along side surface 52, or within a recess (not shown) formed in side surface 52, to enclose the through slot 60. Furthermore, the embodiments of saw bars 10 and 110 may be combined to have two or more channels 70 and/or 170 (not shown) formed in a single saw bar. For example, one channel may be used for spreading a fluid on a surface formed during cutting and another channel used for supplying oil to the nose sprocket 44. We claim all such modifications falling within the scope and spirit of the following claims.

We claim:

1. A saw bar for a chain sawing device having a frame, drive means, means for attaching the saw bar to the frame, an endless cutting chain mounted on the saw bar, and means for driving the cutting chain with the drive means, the saw bar comprising:

a bar member having an attachment end for attachment to the frame, a nose end opposite the attachment end, a peripheral edge including guide means for guiding the endless cutting chain about the peripheral edge, and two opposing side surfaces defining a bar thickness therebetween, with one of the side surfaces having a slot formed therein through at least a portion of the bar thickness, the slot extending from adjacent the attachment end to adjacent the nose end; and channel means positioned in cooperation with the slot and extending from the attachment end toward the nose end for forming a fluid delivery channel in the saw bar to an outlet means in said channel means for permitting the discharge of fluid therefrom.

2. A saw bar according to claim 1 wherein the bar member is solid between the two opposing side surfaces.

3. A saw bar according to claim 1 wherein the slot extends laterally through the bar thickness.

4. A saw bar according to claim 1 wherein the slot extends partially through the bar thickness.

5. A saw bar according to claim 1 wherein:

the chain sawing device includes reservoir means for storing a fluid;

the frame includes passage means for delivering fluid from the reservoir means to the saw bar; and the channel means includes means for receiving the fluid from the passage means.

6. A saw bar according to claim 1 wherein the channel means comprises a tubular member defining an interior passageway through which the fluid flows.

7. A saw bar according to claim 1 wherein the channel means comprises a tubular member sized to be received by the slot and secured therein, such that the tubular member as secured has an exposed exterior wall which is substantially coplanar with the bar member side surface having the slot formed therein.

8. A saw bar according to claim 1 wherein:
the channel means comprises an exterior channel wall facing outwardly from the bar member side surface having the slot cut therein; and
the channel means outlet comprises a plurality of apertures formed in the exterior channel wall.

9. A saw bar according to claim 1 wherein:
the bar member includes a sprocket mounted at the nose end thereof; and
the channel means outlet is located at the nose end for applying fluid to said sprocket.

10. A saw bar according to claim 1 wherein:
the chain sawing device includes lubrication reservoir means for storing a lubrication fluid;
the frame includes lubrication fluid outlet passage means for delivering lubrication fluid from the reservoir means to the saw bar;
the bar member includes sprocket receiving means at the nose end for receiving a sprocket having a plurality of outwardly projecting teeth which engage the cutting chain to guide the cutting chain about the nose end of the saw bar;
bar member is solid between the two opposing side surfaces and has first and second opposing cutting edges;
the slot has first and second branches, with the first branch extending to the lubrication fluid outlet passage means when bar is assembled with the first cutting edge serving as a cutting edge, and the second branch extending to the lubrication fluid outlet passage means when bar is assembled with the second cutting edge serving as said cutting edge; and
the channel means comprises a tubular member defining an interior passageway through which the lubrication fluid flows, the tubular member branching into the branches of the saw bar slot and including means for receiving the lubrication fluid from the lubrication fluid outlet passage means when either of the first and second cutting edges serves as said cutting edge, and the channel means outlet is located at the nose end for applying the lubrication fluid to the sprocket teeth.

11. A saw bar according to claim 1 wherein:
the chain sawing device includes reservoir means for storing a fluid;
the frame includes fluid outlet passage means for delivering fluid from the reservoir means to the saw bar;
bar member is solid between the two opposing side surfaces and has first and second opposing cutting edges;
the slot has first and second branches, with the first branch extending to the fluid outlet passage means when bar is assembled with the first cutting edge serving as a cutting edge, and the second branch extending to the fluid outlet passage means when bar is assembled with the second cutting edge serving as said cutting edge; and
the channel means comprises a tubular member defining an interior passageway through which the fluid flows, the tubular member branching into the branches of the saw bar slot and including means for receiving the fluid from the fluid outlet passage means when either of the first and second cutting edges serves as said cutting edge, the channel means also having an exterior channel wall facing outwardly from the bar member side surface having the slot cut therein, with the channel means outlet comprising the exterior channel wall having a plurality of apertures extending therethrough.

12. A chain sawing assembly comprising:
a frame having reservoir means for storing a fluid;
an endless cutting chain;
drive means for driving the cutting chain;
a saw bar comprising a bar member having an attachment end received by the frame and a nose end opposite the attachment end, a peripheral edge including guide means for guiding the cutting chain about the peripheral edge, and two opposing side surfaces defining a bar thickness therebetween, with one of the side surfaces having a slot formed therein through at least a portion of the bar thickness, the slot extending from the attachment end to the nose end, the saw bar also having channel means positioned in cooperation with the slot and extending from the attachment end to the nose end for forming a fluid delivery channel; and
a passageway to deliver fluid from the reservoir means to said channel means.

13. A chain sawing assembly according to claim 12 wherein the bar member is solid between the two opposing side surfaces.

14. A chain sawing assembly according to claim 12 wherein:
the assembly further includes a sprocket received by the nose end of the saw bar member, the sprocket having a plurality of outwardly projecting teeth which engage the cutting chain to guide the chain about the nose end of the saw bar member; and
the channel means has an outlet located at the nose end for applying the fluid to the sprocket teeth.

15. A chain sawing assembly according to claim 12 wherein:
the frame includes fluid outlet passage means for delivering fluid from the reservoir means to the saw bar;
bar member has first and second opposing cutting edges;
the slot has first and second branches, with the first branch extending to the fluid outlet passage means when bar is assembled with the first cutting edge serving as a cutting edge, and the second branch extending to the fluid outlet passage means when bar is assembled with the second cutting edge serving as said cutting edge; and
the channel means is positioned in cooperation with the branches of the saw bar slot and includes means for receiving fluid from the fluid outlet passage means when either of the first and second cutting edges serves as said cutting edge.

16. A chain sawing assembly according to claim 12 wherein:
the reservoir means contains a lubrication fluid;
the frame includes lubrication fluid outlet passage means for delivering lubrication fluid from the reservoir means to the saw bar;
the assembly further includes a sprocket received by the nose end of the saw bar member, the sprocket having a plurality of outwardly projecting teeth which engage the cutting chain to guide the chain about the nose end of the saw bar member;

bar member has first and second opposing cutting edges;

the bar member slot has first and second branches, with the first branch extending to the lubrication fluid outlet passage means when bar is assembled with the first cutting edge serving as a cutting edge, and the second branch extending to the lubrication fluid outlet passage means when bar is assembled with the second cutting edge serving as said cutting edge; and the channel means comprises a tubular member defining an interior passageway through which the lubrication fluid flows, the tubular member branching into the branches of the saw bar slot and including means for receiving the lubrication fluid from the lubrication fluid outlet passage means when either of the first and second cutting edges serves as said cutting edge, and the channel means has an outlet located at the nose end for applying the lubrication fluid to the sprocket teeth.

17. A chain sawing assembly according to claim 12 wherein:

the frame includes fluid outlet passage means for delivering fluid from the reservoir means to the saw bar;

bar member has first and second opposing cutting edges;

the bar member slot has first and second branches, with the first branch extending to the fluid outlet passage means when bar is assembled with the first cutting edge serving as a cutting edge, and the second branch extending to the fluid outlet passage means when bar is assembled with the second cutting edge serving as said cutting edge; and the channel means comprises a tubular member defining an interior passageway through which the fluid flows, the tubular member branching into the branches of the saw bar slot and including means for receiving the fluid from the fluid outlet passage means when either of the first and second cutting edges serves as said cutting edge, the channel means also having an exterior channel wall facing outwardly from the side surface having the slot cut therein, with the channel means having an outlet comprising a plurality of apertures formed in the exterior channel wall.

* * * * *